3,017,248
PREPARATION OF DIBORANE

Charles C. Clark, Kenmore, and Frank A. Kanda and Aden J. King, Syracuse, N.Y., assignors, by mesne assignments, to Olin Mathieson Chemical Corporation, a corporation of Virginia
No Drawing. Filed Oct. 18, 1956, Ser. No. 616,895
8 Claims. (Cl. 23—204)

This invention relates to the preparation of boron hydrides and, more particularly, provides a method for the production of diborane.

Boron hydrides do not occur in nature but many of them have been successfully prepared. Diborane, tetraborane, pentaborane (9), pentaborane (11) and decaborane are among the better known hydrides. Diborane is useful for conversion to the higher boron hydrides and has been used to produce thin films of pure elementary boron, by thermal decomposition of the hydride on a hot surface. Diborane is also an extremely powerful reducing agent. Diborane can also be used as is described in patent application Serial No. 540,140, filed October 14, 1955, in the name of Weilmuenster et al.

It has heretofore been proposed to produce diborane by reacting boron trifluoride and lithium hydride in an ether solution. This method suffers from various disadvantages from the standpoint of the materials involved. Thus the method employs lithium hydride, a hydride of a metal which is not found widely distributed in nature. Hence, it would be desirable to have available a method for the production of diborane based on more readily available materials. In this invention, diborane is produced from a reduced form of boron, such as elemental boron or metal borides, and metal sulfides in the presence of hydrogen. These materials are readily available. Moreover, the prior art method involves the use of diethyl ether, a solvent which is hazardous to handle. In this invention, no solvent is necessary.

In accordance with the present invention, a method has been devised whereby diborane can be produced in good yields in a controllable reaction using a reduced form of boron and a metal sulfide. The reaction is carried out by heating a mixture of the reduced form of boron and metal sulfide to a temperature of 700° C. to 1800° C. while contacting the mixture with hydrogen. The hydrogen requires no special purification. Commercial hydrogen as supplied in cylinders under pressure is satisfactory. The necessary heat can be supplied in any suitable manner. A particular advantageous method is by electrical introduction. For this purpose, an electrically conductive material is provided to support or surround the reaction mixture and is arranged for the introduction of hydrogen gas and removal of the gaseous products. A vertical graphite tube of suitable diameter, water cooled at one end and arranged to support the reaction mixture at the other, has been found satisfactory. The graphite tube is surrounded by a fused silica jacket which, in turn, is jacketed and water cooled. Hydrogen gas is introduced into the water cooled end of the graphite tube, contacting the reaction mixture and then passing into an ordinary glass system for collection of the volatile products. The outer jacket is surrounded by turns of an induction coil suitably supplied with high frequency current. The diborane product is separated from the unreacted hydrogen and other products of the reaction by condensation at —196° C. The remaining hydrogen is suitable for recycle to the reaction zone. If small proportions of other boron hydrides are obtained, they are readily removed in a cool zone before the diborane product is condensed.

Example I

A Vycor (fused silica) tube about 1¼ inches in diameter and 8 inches long was arranged vertically with an exit at the top for the gaseous products of the reaction. Inserted into the fused silica tube from the bottom was a graphite cylinder ending about 2 inches below the top of the fused silica tube and extending below it. The graphite cylinder had an external diameter of about ¾ inch, an internal diameter of about ½ inch and a wall thickness of ⅛ inch. It was retained in place by a stopper at the bottom and the extended part of the graphite carried a brass water cooling jacket. A tantalum plate about 2 inches below the top of the graphite cylinder and arranged inside the graphite cylinder supported the solid mixture charged to the reaction. The silica tube was surrounded by a water jacket. At the level of the tantalum plate, the water jacket was surrounded by an induction heater, comprising several turns of heavy copper tubing, about ¼ inch in external diameter and cooled internally by a stream of water. The induction heater was supplied by a high frequency current. The tantalum support was charged with a mixture of 1 g. of cuprous sulfide and 0.5 g. of boron. This mixture was heated at 800° C. for 2 hours while a stream of hydrogen amounting to about 2 liters per minute was passed through the apparatus. The exit products were collected in a trap cooled to —196° C. with liquid nitrogen and analyzed by means of infrared. 5 mg. of diborane were obtained in this example.

Example II

The apparatus used in this example was the same as that described in Example I. The tantalum support was charged with a mixture of 3.6 g. of manganese boride and 1 g. of ferrous sulfide. This mixture was heated at 1150° C. for one-half hour while a stream of hydrogen amounting to about 2 liters per minute was passed through the apparatus. The exit gases were condensed in a trap cooled to —196° C. An infrared analysis of the gases showed that 0.6 mg. of diborane was obtained in this experiment.

Various modifications can be made in the procedures of the specific examples to provide other embodiments which fall within the scope of this invention. Thus, in place of the elementary boron and manganese boride, there can be substituted other reduced forms of boron, such as boron carbide, calcium boride, barium boride, aluminum borides, chromium borides, tungsten boride, magnesium boride, nickel borides, cobalt borides, copper boride, silicon borides and titanium boride. Also, in place of the cuprous sulfide and ferrous sulfide, there can be substituted other metal sulfides, particularly heavy metal sulfides, such as lead sulfide, nickel sulfide, zinc sulfide, and molybdenum sulfide. Preferably, the ratio of the number of gram atoms of boron in the reduced form of boron to the number of gram atoms of sulfur present in the sulfide is within the range 1:1 to 10:1, although ratios above and below the range are useful, for example 0.5:1 and 20:1. The reaction temperature can be varied from 700° C. to 1800° C., preferably 800° C. to 1200° C. Hydrogen can be supplied to the reaction as such or in the form of a hydrocarbon, such as methane, ethane, ethylene, acetylene, propane, propylene, or mixtures thereof, which decompose to yield hydrogen under the reaction conditions.

We claim:
1. A method for the preparation of diborane which comprises reacting a material selected from the class consisting of elemental boron and manganese boride with a heavy metal sulfide in a hydrogen atmosphere at a temperature of from 700° C. to 1800° C., and recovering diborane from the reaction mixture.

2. The method of claim 1 wherein the ratio of the number of gram atoms of boron present in the said material to the number of gram atoms of sulfur present in the heavy metal sulfide is within the range 1:1 to 10:1.

3. The method of claim 1 wherein the said material is elementary boron.

4. The method of claim 1 wherein the said material is manganese boride.

5. The method of claim 1 wherein the heavy metal sulfide is cuprous sulfide.

6. The method of claim 1 wherein the heavy metal sulfide is ferrous sulfide.

7. The method of claim 1 wherein the said material is elementary boron and wherein the heavy metal sulfide is cuprous sulfide.

8. The method of claim 1 wherein the said material is manganese boride and wherein the heavy metal sulfide is ferrous sulfide.

No references cited.